(12) United States Patent
Cretors

(10) Patent No.: US 9,408,496 B2
(45) Date of Patent: Aug. 9, 2016

(54) HEATED AIR HOT DOG ROLLER

(71) Applicant: C. Cretors & Company, Chicago, IL (US)

(72) Inventor: Charles D. Cretors, Lake Forest, IL (US)

(73) Assignee: C. Cretors & Company, Wood Dale, IL (US)

( * ) Notice: Subject to any disclaimer, the term of this patent is extended or adjusted under 35 U.S.C. 154(b) by 121 days.

(21) Appl. No.: 14/161,551

(22) Filed: Jan. 22, 2014

(65) Prior Publication Data

US 2014/0234508 A1     Aug. 21, 2014

Related U.S. Application Data

(60) Provisional application No. 61/755,067, filed on Jan. 22, 2013.

(51) Int. Cl.
| | | |
|---|---|---|
| A22C 7/00 | (2006.01) | |
| A23P 1/00 | (2006.01) | |
| A47J 43/18 | (2006.01) | |
| A47J 39/00 | (2006.01) | |
| B21B 27/06 | (2006.01) | |
| H05B 3/02 | (2006.01) | |
| A47J 37/04 | (2006.01) | |

(52) U.S. Cl.
CPC .................................. *A47J 37/048* (2013.01)

(58) Field of Classification Search
CPC ....... A47J 37/04; A47J 37/041; A47J 37/042; A47J 37/048

USPC ................ 99/427, 441, 443 R, 448; 426/523; 219/469

See application file for complete search history.

(56) References Cited

U.S. PATENT DOCUMENTS

| | | | |
|---|---|---|---|
| 1,904,198 | A | 4/1933 | Brand |
| 2,584,061 | A | 1/1952 | Stilphen |
| 2,631,525 | A | 3/1953 | Finizie |
| 2,697,395 | A | 12/1954 | Steriss |
| 2,825,192 | A | 3/1958 | Brodsky |
| 3,298,303 | A | 1/1967 | Waller |
| 4,055,677 | A | 10/1977 | White |
| 4,516,485 | A | 5/1985 | Miller |
| 4,522,117 | A | 6/1985 | Weimer et al. |
| 4,633,772 | A | 1/1987 | Bowden et al. |
| 4,704,956 | A | 11/1987 | Gill |
| 4,763,570 | A | 8/1988 | Bellanca |

(Continued)

FOREIGN PATENT DOCUMENTS

| | | |
|---|---|---|
| WO | 9215183 | 9/1992 |
| WO | WO-9215183 A1 | 9/1992 |

OTHER PUBLICATIONS

Gold Medal Products Co.; "Funfood Equipment & Supplies" catalog; vol. 56, dated 2000, 108 pages.

(Continued)

*Primary Examiner* — Dana Ross
*Assistant Examiner* — Lindsey C Teaters
(74) *Attorney, Agent, or Firm* — Perkins Coie LLP

(57) ABSTRACT

Heated air roller cookers and methods for cooking hot dogs are disclosed herein. An embodiment of a roller cooker configured in accordance with the present disclosure includes a plurality of rollers and a heating element positioned to heat air. A blower can be positioned to direct the heated air through the rollers.

9 Claims, 4 Drawing Sheets

(56) References Cited

U.S. PATENT DOCUMENTS

| | | |
|---|---|---|
| 4,982,657 A | 1/1991 | Ghenic |
| 5,117,748 A | 6/1992 | Costa |
| 5,211,106 A * | 5/1993 | Lucke .................. A47J 37/044 219/400 |
| 5,533,440 A | 7/1996 | Sher |
| 5,611,263 A | 3/1997 | Huang |
| 6,393,971 B1 | 5/2002 | Hunot et al. |
| 6,575,083 B2 | 6/2003 | Haas et al. |
| 6,800,314 B2 | 10/2004 | Evans et al. |
| 7,377,209 B2 | 5/2008 | Perttola |
| 7,591,220 B2 | 9/2009 | Sheridan, Jr. |
| 7,658,143 B2 | 2/2010 | Cretors |
| 8,148,669 B2 | 4/2012 | Schwierking et al. |
| 8,436,281 B2 | 5/2013 | Cretors |
| 8,828,468 B2 | 9/2014 | Cretors |
| 2010/0163548 A1 | 7/2010 | Cretors |
| 2010/0170885 A1 * | 7/2010 | Cretors .................. H05B 3/02 219/469 |
| 2013/0104750 A1 * | 5/2013 | Hankins ................ A47J 37/048 99/441 |

OTHER PUBLICATIONS

International Search Report and Written Opinion for PCT/US05/42059; Applicant: C. Cretors and Company; Date of Mailing: Nov. 22, 2006, 8 pages.

Proctor Companies; "Concession Stands and Equipment" catalog, vol. 3, 1996, 84 pages.

Proctor Companies; Equipment Catalog, 1992, 33 pages.

\* cited by examiner

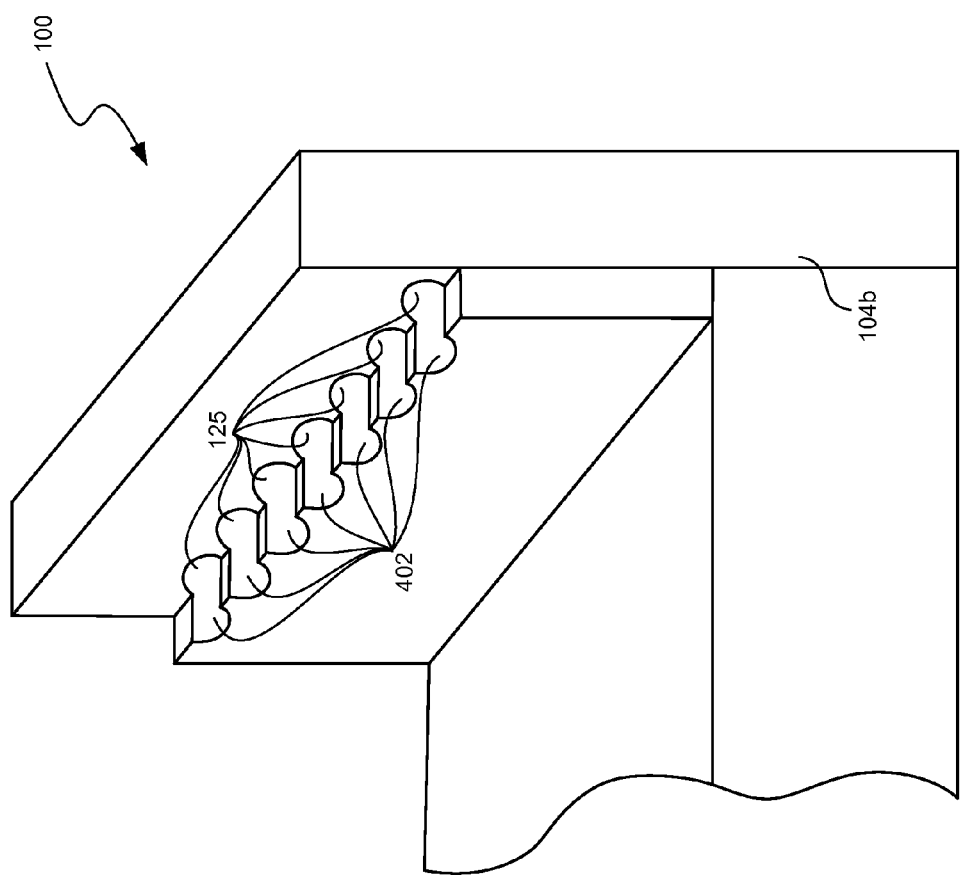

HEATED AIR HOT DOG ROLLER

CROSS-REFERENCE TO RELATED APPLICATION

This application claims the benefit of U.S. Provisional Application No. 61/755,067, filed Jan. 22, 2013, entitled "HEATED AIR HOT DOG ROLLER," the entirety of which is incorporated herein by reference.

TECHNICAL FIELD

The present disclosure relates generally to devices for heating and/or cooking hot dogs. In particular, the present disclosure relates to roller cookers having forced air heating systems for cooking hot dogs, sausages, and/or other foods.

BACKGROUND

Conventional devices for heating hot dogs include tubular rollers that support the hot dogs. In many of these devices, electric heating elements are positioned inside the rollers to heat the rollers, and a drive mechanism is coupled to the rollers to turn the rollers. The hot dogs are rotated and heated due to contact with the rollers.

Positioning the heating elements inside the rotating rollers can require complicated designs and complex parts and assemblies. As the hot dogs are heated, for example, the rollers can be become covered with juices that naturally cook out of the hot dogs. The juices (and/or other contaminants) can foul the parts and assemblies, causing malfunctions or failures.

BRIEF DESCRIPTION OF THE DRAWINGS

FIG. 4 is an isometric view of a portion of a roller cooker configured in accordance with an embodiment of the present disclosure.

DETAILED DESCRIPTION

The following disclosure describes several embodiments of heated air hot dog roller cookers. Heated air roller cookers configured in accordance with the present technology can be used to heat and/or cook various food products, including hot dogs, sausage links, bratwurst, other forms of encased meat, or any kind of food that can be prepared by rotation or other movement with a heated roller. Specific details of several embodiments of the present disclosure are described below with reference to FIGS. 1-7 to provide a thorough understanding of the embodiments. Other details describing well-known structures and systems often associated with heating or cooking food, however, are not set forth below to avoid unnecessarily obscuring the description of the various embodiments. Accordingly, those of ordinary skill in the art will understand that the invention may have other embodiments in addition to those described below. Such embodiments may include other elements and features in addition to those described below, or they may lack one or more of the features or elements described below.

The roller cookers described herein can be configured in a variety of suitable ways. For example, roller cookers configured in accordance with the present technology, and the various features thereof, can be combined with other heating or cooking devices. In particular, the technology described herein can be combined with devices and features described in U.S. Provisional Patent Application No. 61/141,932, filed on Dec. 31, 2008, and entitled "Food Heaters with Removable Rollers," and U.S. patent application Ser. No. 12/650,181, filed on Dec. 30, 2009, and entitled "Food Heaters with Removable Rollers," the entireties of which are incorporated herein by reference.

Figure 1:
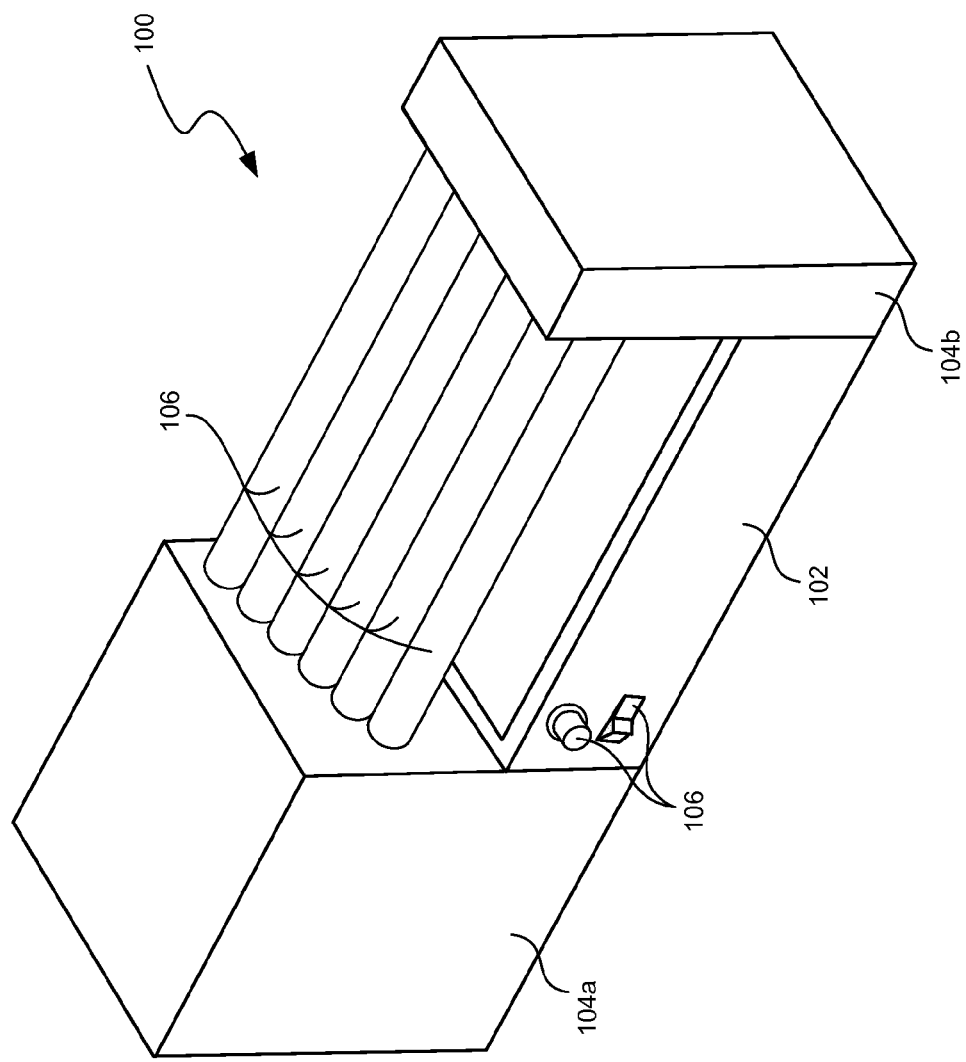
FIG. 1 is an isometric view of a heated air roller cooker configured in accordance with an embodiment of the present disclosure.

FIG. 1 is an isometric view of a heated air hot dog roller cooker 100 ("roller cooker 100") configured in accordance with an embodiment of the present disclosure. The roller cooker 100 includes a base structure 102, a first end portion 104a and a second end portion 104b (collectively, the end portions 104). A plurality of rollers 106 extend between the first end portion 104a and the second end portion 104b. The roller cooker 100 can include a plurality of user controls 106 for controlling various operations for heating and/or cooking hot dogs.

Figure 2:
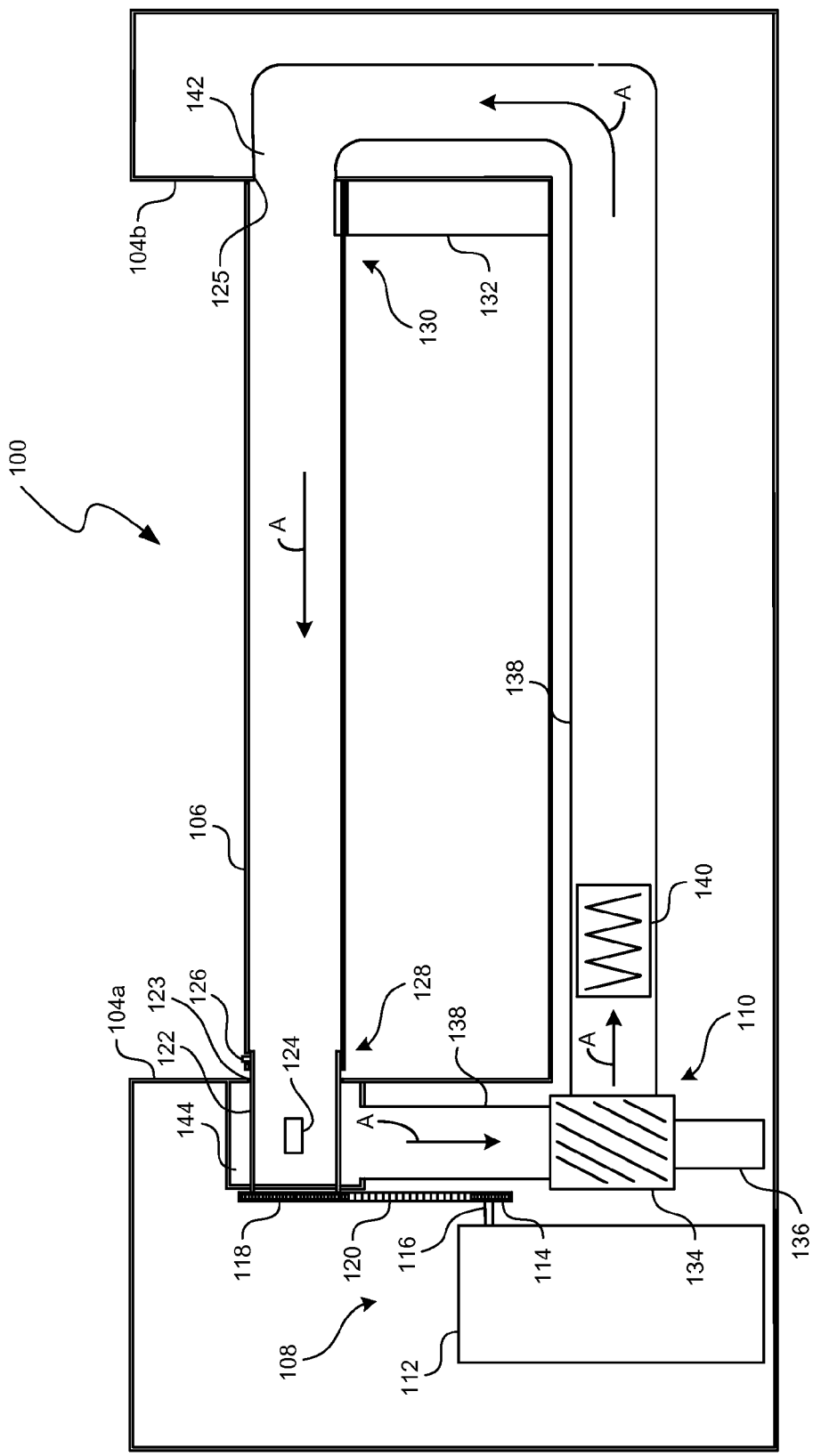
FIG. 2 is a partially schematic, partial cross-sectional view of the heated air roller cooker of FIG. 1 configured in accordance with an embodiment of the present disclosure.

FIG. 2 is a partially schematic, partial cross-sectional front view of the roller cooker 100 of FIG. 1. In the illustrated embodiment, the roller cooker 100 includes a drive mechanism 108 and a forced air heating system 110. The drive mechanism 108 includes a drive motor 112 (e.g., an electric motor) that is operably coupled to a drive gear 114 via a drive shaft 116. The drive gear 114 is operably coupled to a plurality of roller gears 118 (only one roller gear 118 is visible in FIG. 2) via a drive member such as a drive chain 120. Each of the individual roller gears 118 is operably coupled to a corresponding drive cylinder 122. Each of the drive cylinders 122 (only one visible in FIG. 2) can extend through a corresponding opening 123 (only one visible in FIG. 2) in the first end portion 104a, and can include one or more outlets 124 and a post or pin 126. Each of the rollers 106 (only one visible in FIG. 2) can be operably coupled to a corresponding drive cylinder 122 at a first end 128, and can be rotatably supported at a second end 130 by a pedestal 132 adjacent to corresponding openings 125 (only one visible in FIG. 2) in the second end portion 104b.

The heating system 110 can include a blower 134 driven by a blower motor 136. The blower 134 can be operably coupled (via, e.g., suitable manifolds) to air ducts 138 that extend between the first ends 128 and the second ends 130 of the rollers 106 via the blower 134. The air ducts 138 can include an inlet plenum 142 adjacent to the second end 130 of the rollers 106 and an outlet plenum 144 adjacent to the first end of the rollers 106. A heating element 140 (e.g., an electrical heating element) can be positioned within one of the air ducts 138. The heating element 140 can extend along or through the air ducts 138 in a variety of suitable manners. For example, in some embodiments, the heating element 140 can be positioned to extend across a majority of the cross-sectional area of the air ducts 138.

Figure 3:
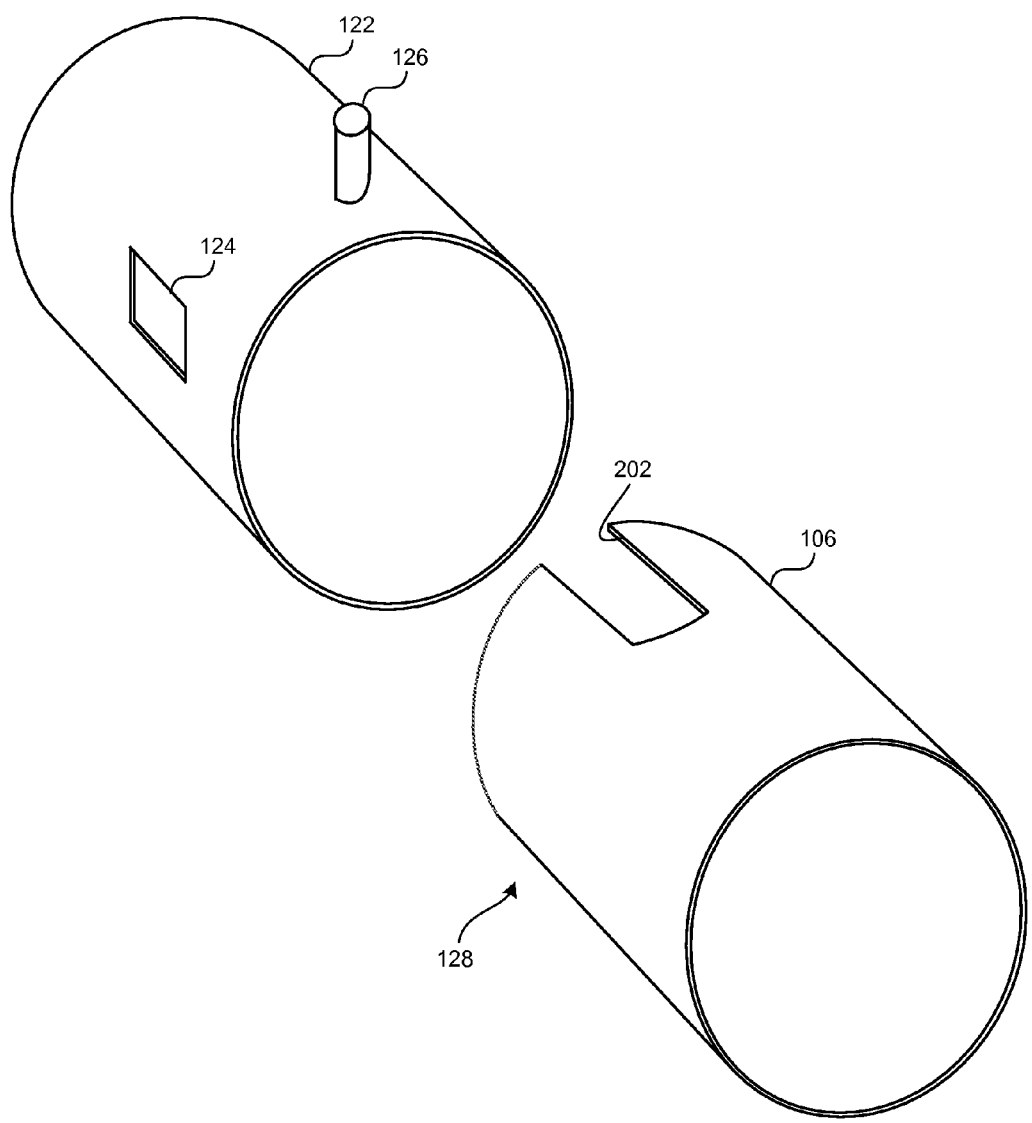
FIG. 3 is an isometric view of a portion of a roller cooker drive mechanism configured in accordance with an embodiment of the present disclosure.

FIG. 3 is an isometric view of a portion of one of the drive cylinders 122 and a portion of one of the rollers 106 configured in accordance with an embodiment of the present disclosure. The first end 128 of the roller 106 includes a key way or slot 202 configured to receive and engage the pin 126. For example, the roller 106 can be positioned to fit over and encircle the drive cylinder 122 with the pin 126 positioned within the slot 202.

FIG. 4 is an isometric view of the second end portion 104b of the roller cooker 100 configured in accordance with an embodiment of the present disclosure. In the illustrated embodiment, the pedestal 132 includes a plurality of troughs 402 adjacent to the openings 125 to support the rollers 106. The openings 125 can direct air to the rollers 106 from the inlet plenum 142 (FIG. 2), as further described below.

In operation, referring to FIGS. 1-4 together, the controls 106 can be operated to energize the drive system 108 and the forced air heating system 110. The drive motor 112 rotates the drive gear 114, thereby rotating the drive chain 120. Rotation of the drive chain 120 rotates the drive cylinders 122 via the corresponding roller gears 118. The pins 126 on the rotating drive cylinders 122 engage and rotate the corresponding rollers 106. As the rollers 106 rotate, hot dogs and/or other food items placed thereon are rotated.

The blower motor 136 drives the blower 134, which circulates air through the air ducts 138 and the rollers 106 in a loop in the direction of the arrows A. The heating element 140 heats the air as it passes through the air ducts 138. The heated air can be directed through the air ducts 138 to the rollers 106 via the inlet plenum 142 and the openings 125. As the heated air passes through the rollers 106, the air heats the rollers 106 to heat and/or cook hot dogs supported thereon. In some embodiments, the roller cooker 100 can be configured to heat the rollers to 175 degrees Fahrenheit or about 175 degrees Fahrenheit. In other embodiments, the roller cooker 100 can be configured to heat the rollers 106 to higher and/or lower temperatures. After passing through the rollers 106, the heated air enters the corresponding drive cylinders 122 and passes into the outlet plenum 144 via the outlet ducts 124 to return to the blower 134.

Embodiments in accordance with the present technology can provide several advantages over conventional hot dog cookers. For example, the rollers 106 do not require internal heating elements and they can be easily removed and cleaned. Additionally, conventional rollers that are heated via resistance wires often provide an uneven or inconsistent temperature distribution. In several embodiments, the forced air heating system 110 can provide relatively equal amounts of heated air to each of the rollers 106, producing a more consistent temperature distribution.

Although the components and features of the embodiments illustrated in FIGS. 1-4 are shown in various arrangements and positions, other configurations of the components and features of the present technology are within the scope of the disclosure. For example, although the forced air heating system 110 of the roller cooker 100 includes a single heating element 140 positioned within the heating duct 138, other embodiments can include additional heating elements 140 and/or heaters located in a variety of suitable positions. In some embodiments, a heater can be positioned between heating ducts 138. Furthermore, one or more blowers 134 can be positioned in a variety of locations to direct air to the rollers 106 either directly or indirectly (e.g., via ducts or other components). Additionally, although the illustrated embodiments include six rollers 106, other embodiments can include additional or fewer rollers 106. Furthermore, although the drive system 108 described above includes drive cylinders 122 and various other components, roller cookers in accordance with the present technology can include a variety of suitable drive systems that contain additional and or fewer components arranged in variety of suitable configurations.

From the foregoing, it will be appreciated that specific embodiments of the invention have been described herein for purposes of illustration, but that various modifications may be made without deviating from the spirit and scope of the invention. Aspects of the invention described in the context of particular embodiments may be combined or eliminated in other embodiments. Furthermore, while advantages associated with certain embodiments of the invention have been described in the context of those embodiments, other embodiments may also exhibit such advantages, and not all embodiments need necessarily exhibit such advantages to fall within the scope of the invention.

The invention claimed is:

1. A roller cooker comprising:
a plurality of rollers, wherein the plurality of rollers comprise hollow cylindrical tubes;
a heating element positioned to heat air;
an air duct;
a blower positioned to circulate the heated air in a loop through the air duct and the plurality of rollers; and
a pedestal having a plurality of troughs configured to rollably support end portions of corresponding individual rollers, wherein the individual troughs are positioned adjacent to individual openings, and wherein the individual openings direct the heated air from the air duct into the corresponding individual rollers.

2. The roller cooker of claim 1, further comprising:
a plurality of drive cylinders, wherein each of the drive cylinders is individually coupled to a corresponding roller;
a plurality of roller gears, wherein each of the roller gears is individually coupled to a corresponding drive cylinder; and
a drive gear operably coupled to the plurality of roller gears via a drive chain, wherein the drive gear rotates the drive chain to rotate the plurality of roller gears, wherein the individual roller gears rotate the corresponding drive cylinders, and wherein the drive cylinders rotate the corresponding rollers.

3. The roller cooker of claim 2 wherein the individual drive cylinders comprise cylindrical tubes having individual outlet ducts, and wherein the heated air is directed through the rollers and into the drive cylinders, and wherein a portion of the heated air flows out of the outlet ducts.

4. A roller cooker comprising:
a plurality of rollers;
a heating element positioned to heat air;
a blower positioned to direct the heated air through the rollers; and
a base having a first end portion spaced apart from a second end portion, and a pedestal having a plurality of troughs, wherein the plurality of rollers extend from the first end portion to the second end portion and are supported at the second end portion via the troughs, and wherein the rollers are individually removable from the roller cooker via lifting of the individual rollers from the corresponding troughs.

5. The roller cooker of claim 4, further comprising a first air duct, a second air duct, an inlet plenum, and an outlet plenum, wherein the heated air is directed in a loop from the blower, through the first air duct to the inlet plenum, through the plurality of rollers, through the outlet plenum, and through the second air duct back to the blower.

6. A roller cooker comprising:
a plurality of rollers, wherein each of the rollers extends between a first end portion and a second end portion;
a drive mechanism positioned to rotate the rollers;
a heating element positioned to heat air;
a blower;
an air duct operably coupled to the rollers via and inlet plenum, wherein the blower directs air through the air duct and into the rollers via the inlet plenum and through the rollers from the second end portions toward the first end portions; and a pedestal having a plurality of troughs, individual troughs positioned to rollably support end portions of individual rollers, wherein the individual rollers are removable from the roller cooker via lifting of the individual rollers from the corresponding individual troughs.

7. The roller cooker of claim 6 wherein the drive mechanism includes:
   a plurality of roller gears operably coupled to corresponding rollers; and
   a drive chain that drives the roller gears to rotate the plurality of rollers.

8. The roller cooker of claim 6 wherein the blower is in fluid communication with the air duct and the plurality of rollers.

9. The roller cooker of claim 6 wherein the drive mechanism includes a plurality of drive cylinders, and wherein the plurality of rollers are removably coupled to corresponding drive cylinders.

* * * * *